May 23, 1967 F. T. FUGE ETAL 3,321,087

PIPETTE

Filed May 1, 1964

INVENTORS
FERDINAND T. FUGE
JOHN K. GARBER
BY
Harvey W. Edelblute
ATTORNEY

United States Patent Office 3,321,087
Patented May 23, 1967

3,321,087
PIPETTE
Ferdinand T. Fuge, Winsted, Conn., and John K. Garber, Lansdale, Pa., assignors to Richardson-Merrell Inc., New York, N.Y., a corporation of Delaware
Filed May 1, 1964, Ser. No. 364,203
2 Claims. (Cl. 210—459)

This invention relates to a pipette for removing fluids from a container which also contains extraneous matter that is not desired to be removed with the fluid. In particular, the invention relates to a pipette for harvesting the allantoic fluid from partially incubated eggs and to its use.

Many viral vaccines are made by inoculating an incubating egg with a suitable strain of a live virus and allowing incubation to continue for a few days during which time the viral agent propagates in the living tissue. At a suitable period of time after inoculation, for instance, after about six days of incubation, the egg shell is opened and the allantoic fluid is removed and made into a vaccine. In a large vaccine producing operation, thousands of embryonated eggs are handled every hour. Care must be taken when recovering the allantoic fluid to avoid rupturing the yolk sac or amniotic membrane and thus contaminate the allantoic fluid with blood and other debris. It is desirable, of course, to harvest as much of the allantoic fluid as possible. Previously, this operation has been carried out by hand but the operation is time consuming and great skill is required.

Various kinds of pipettes have been devised to facilitate the removal of the allantoic fluid and avoid collection of cell debris from the embryo. The present invention relates to an improved pipette for collecting allantoic fluid from incubated fowl eggs which is particularly adapted to be used with automated equipment, although it may be used by hand as other pipettes have been used before. The new pipette of the present invention enables complete and high speed removal of allantoic fluid from incubated eggs without breaking up the embryo and other tissues which may be present in the egg. In order that the present invention may be more readily understood, reference is made to the accompanying drawing in which:

Referring again to FIGURE 1, it will be seen that the pipette of the present invention comprises a tubular pipette member 1 approximately one half inch in outside diameter having a closed conical lower end 2. In the preferred embodiment shown, the cone has an included angle of about 68 degrees. It is important that this angle be neither too blunt nor too sharp as it may then pierce the yolk sac 5 and release yolk into the allantoic fluid in the chorio-allantoic cavity 4. An included angle for the cone of between about 45 to 90 degrees is suitable. The cone should also have a relatively smooth surface so as to avoid rupturing the yolk sac of the incubated egg when it is used.

Figure 2:
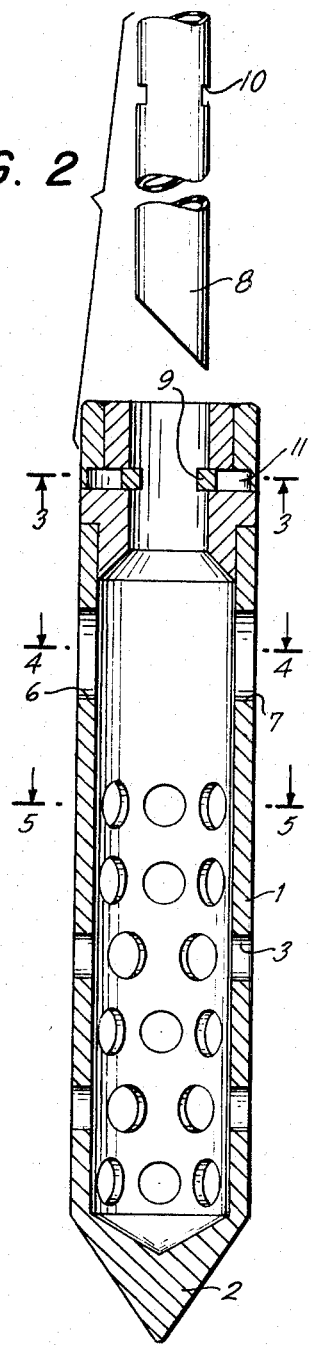
FIGURE 2 is an enlarged cross sectional view in elevation of the pipette with parts broken away.
Figure 3:
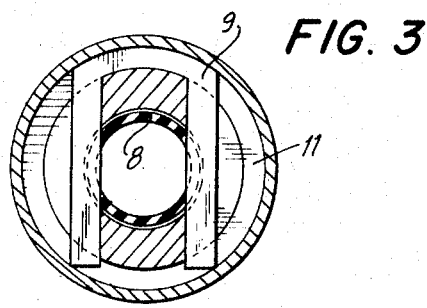
FIGURE 3 is a cross section taken along line 3—3 of FIGURE 2.
Figure 4:
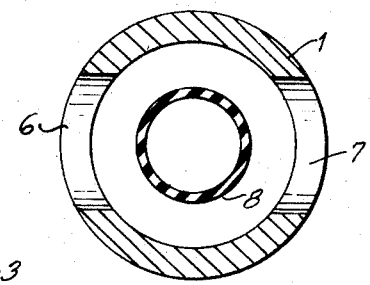
FIGURE 4 is a cross section taken along line 4—4 of FIGURE 2.
Figure 5:
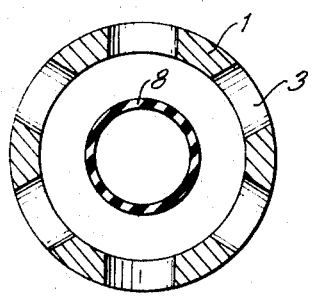
FIGURE 5 is a cross section taken along line 5—5 of FIGURE 2.

As will be seen from the drawing, a number of small holes are drilled through the lower section of the tubular body. These holes are preferably about 3/32 of an inch in diameter and may be staggered as shown in FIGURE 2 of the drawing. They extend about half the distance up the barrel of the pipette as shown. These holes serve the function of permitting the allantoic fluid in the incubated egg to pass through without, however, permitting parts of the yolk sac or embryo to enter. In the upper section of the tubular member, apertures 6 and 7 of about 1/4 inch in diameter are provided. These are important in that they allow air to enter the pipette when suction is applied through tube 8, thus exerting atmospheric pressure on the allantoic fluid entering the pipette through apertures in the lower section of the barrel when they are immersed in the allantoic fluid. The suction tube 8 which carries away the allantoic fluid extending along the axis of the pipette substantially its full length is held firmly in the barrel of the pipette in suitable manner. In the particular embodiment illustrated, a steel spring 9 fitting in slots 10 on the inner tube and 11 of the outer casing hold it firmly in place. As will be noted, the lower end of the suction tube is cut at an angle to provide clearance for the allantoic fluid at the bottom of the pipette. A rubber suction tube (not shown) is attached to the upper end of the tube when the pipette is in use for removing the harvested fluid.

Figure 1:
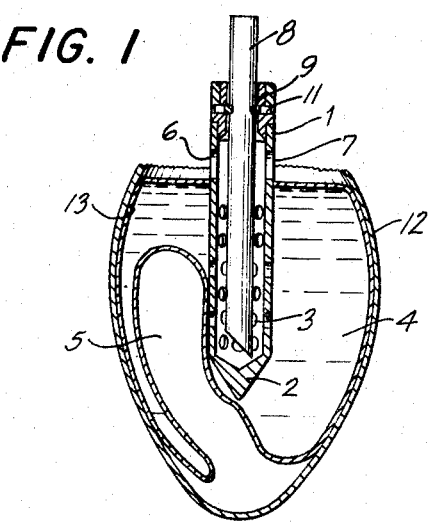
FIGURE 1 is a cross section in elevation of the pipette of the present invention in harvesting position.

In operating the harvest pipette, the incubated egg is opened by cutting off the air sac end of the egg 12 as shown in FIGURE 1 and the pipette is pushed through the shell membrane 13, suction being applied to the pipette as the point 2 breaks through the membrane into the chorio-allantoic cavity. As the pipette slowly enters the cavity, the pointed tip pushes aside the embryo and yoke sac as it descends without, however, rupturing the same. The downward movement is continued until the conical tip of the pipette is approximately to the bottom of the chorio-allantoic cavity so that substantially all of the fluid in it may be sucked into the pipette.

The two 1/4 inch diameter holes near the top of the pipette allow atmospheric air pressure to be exerted on the fluid inside the harvest needle. This prevents the creation of a vacuum inside the needle when all of the small holes are immersed in fluid and suction is applied to the inner tube. It also enables the fluid to flow into the suction tube at a more desirable rate. When the fluid has been removed from the chorio-allantoic cavity, the pipette is withdrawn, the suction is discontinued, and another incubated egg is moved into place.

What is claimed is:

1. A pipette for harvesting allantoic fluid from partially incubated eggs which consists of a slender tubular pipette member being closed at the lower end by a smoothly faced conical point, said tubular pipette member having a plurality of small openings in the section adjacent the conical end adapted to permit entry of allantoic fluid without permitting simultaneous entry of tissue particles, an opening in the upper section of said tubular pipette member permitting entry of air, a smaller tubular member extending along the axis substantially the full length of the tubular pipette member and means for detachably securing said smaller tubular member within said tubular pipette member whereby suction may be applied to withdraw allantoic fluid entering the interior of the pipette the said smaller tubular member terminating in an open end cut at an angle.

2. A pipette for harvesting allantoic fluid from partially incubated eggs which consists of a slender tubular pipette member having a smoothly surfaced conical lower end having an included angle of between about 45° to 90° whereby said pipette may be inserted in the aperture of a partially incubated egg to push aside the membranes therein without rupturing them, said lower end closes off the interior of said member, a plurality of small holes in the lower section of said tubular pipette member permitting passage of allantoic fluid into the interior thereof, an opening in the upper side wall of said tubular pipette member permitting the entry of air when the pipette is inserted in said partially incubated egg and suction is applied, an interiorally mounted suction tube extending along the axis of said tubular pipette member substantially its full length and having an opening near the closed end of said tubular pipette member, and means for detachably securing said suction tube within said tubular pipette member, and means for detachably securing said suction tube within said tubular pipette member whereby substantially all of the allantoic fluid passing into said pipette may be withdrawn by suction applied to said inner tubular member.

References Cited by the Examiner

UNITED STATES PATENTS

| | | | |
|---|---|---|---|
| 539,800 | 5/1895 | Durant | 210—460 |
| 1,941,304 | 12/1933 | Heylandt | 141—285 |
| 2,667,075 | 1/1954 | Blum et al. | 73—425.4 |

LAVERNE D. GEIGER, *Primary Examiner.*

E. J. EARLS, *Assistant Examiner.*